Aug. 16, 1949.                J. A. DUNN                2,479,328
                           SPREADING DEVICE
                        Filed Nov. 30, 1945
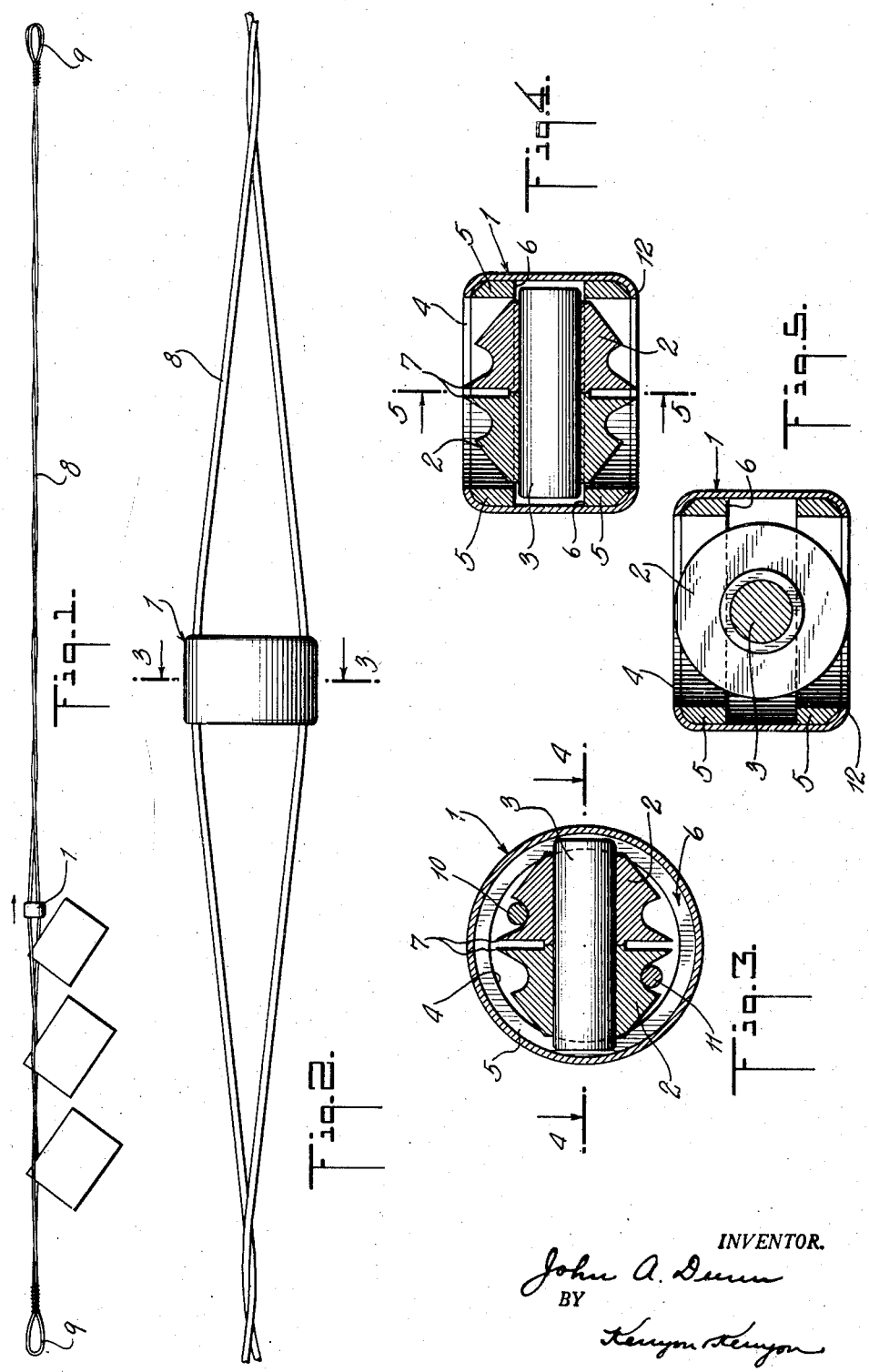
INVENTOR.
John A. Dunn
BY
Kenyon Kenyon
ATTORNEYS Patented Aug. 16, 1949

2,479,328

UNITED STATES PATENT OFFICE 2,479,328

SPREADING DEVICE

John A. Dunn, Hempstead, N. Y.

Application November 30, 1945, Serial No. 631,907

8 Claims. (Cl. 211—119.13)

My invention relates to improvements in spreading devices and more particularly to those which, in combination with two or more wires held in contact with one another under tension, are adapted to separate the tensioned wires at points along the line thereof at which they are rotated.

One of the objects of my invention is to utilize the improved spreading device in connection with a plurality of wires held in twisted relation under tension to separate and reunite them for any purpose desired.

Another object of my invention is the employment of the improved device in connection with a line formed of permanently twisted wires held under tension, which will make unnecessary the use of clothes pins or any other supplementary means for attaching clothes or articles to the line, the line itself, in conjunction with my improved spreader constituting the means required both for fastening articles or clothing thereto and releasing them therefrom.

How these and other related objects may be attained by my invention will be evident from the following specification, in connection with the drawings forming part thereof, in which Fig. 1 is a side elevation of a line formed of two twisted wires, under tension, combined with my spreader, showing articles suspended therefrom;

Fig. 2 is an enlarged elevational view of the line and spreading device;

Fig. 3 is a sectional view of the spreader on the line 3—3 of Fig. 2;

Fig. 4 is a sectional view on the line 4—4 of Fig. 3, and

Fig. 5 is a sectional view on the line 5—5 of Fig. 4.

In the drawings similar reference numerals refer to like parts.

My improved spreading device preferably consists of a tubular member 1 within which are located twin grooved pulleys 2 mounted on a spindle 3, the open ends 4 of the tubular member being flanged as shown at 12, and also reduced in diameter by the permanent attachment thereto of metal rings 5. These rings or ring members 5 extend but a short distance within the tubular member, being spaced apart for the double purpose of providing a raceway 6 for the spindle and at the same time retaining it with the pulleys thereon, in place, during the operation of the spreader. The pulleys are mounted side by side and, for the reason hereinafter described, the inner rim or flange of both is higher than their outer rims or flanges as shown at 7, and substantially contact with each other.

The operation of the device will be clear from the following description of its use in connection with a clothes-line of the type referred to above consisting of two wires permanently twisted together.

It will be obvious that the twisted wires of which the line is preferably made must be under such tension as to normally maintain them in close relationship. In Fig. 1 I have shown such a line, 8, provided with loops 9 for attachment to posts or other supports, on which my spreader has been threaded. It will be understood also that the spreading device is first threaded on the wires before they are permanently twisted together, and by any suitable means, furnished with terminal loops. This is done by running each of the two wires of the line through the tubular member 1 and over one of the pulleys 2 so that each line will be positioned in the groove of a separate pulley as shown at 10 and 11, the wires being thus held apart at the place where the spreader is located.

When the line 8 is ready for use it is fastened between posts or the like (not shown). Assuming that the spreader is positioned at the left of the line where it is holding the wires in spaced relation, a part of a garment or other article is slipped into the spaced section and the spreader moved to the right, whereby the said spaced section is automatically closed to grip the garment or article as the spreader opens another section of the line which in turn is put to use in the same way, each advance of the spreader repeating this double function. When the articles are ready to be taken from the line they are released by the operation of the spreader in the reverse direction.

The elements of my spreader have been combined to produce what I consider to be a practically indestructible device and one that is adapted to operate smoothly at all times. The spindle or shaft is provided with a raceway which gives it a universal bearing. By this means the pulleys are allowed freedom of movement to respond to the pulls of the lines in various directions thus preventing the disruption or breakage which would probably result if the spindle or shaft were stationed in a fixed bearing. To avoid the jamming of the line in use I have elevated the inner flanges of the pulleys. By this means each of the two wires of the line is retained in its proper groove and jumping of the same from one pulley to another rendered impossible.

While a specific embodiment of the invention has been described, it is to be understood that various changes and modifications may be made therein without departing from the invention and the scope of the claims appended hereto.

I claim:

1. In combination in a spreader of the character described, a tubular member the interior of which is reduced in diameter at both ends, a pair of spaced ring members positioned intermediate said reduced portions and forming with said tubular member a raceway, a spindle and a pulley movable thereon, said raceway receiving the ends of the spindle.

2. In combination in a spreader of the character described, a tubular member, a ring member permanently fixed to the interior of each open end of the said tubular member and spaced from each other, and located within the said tubular member, a spindle, two pulleys loosely mounted thereon, said ring members and the tubular member forming a raceway receiving the ends of the spindle.

3. In combination in a spreader of the character described, a tubular member, a circular member permanently fixed to the interior of each open end of the said tubular member and spaced from each other, a spindle, two pulleys each having a high inner flange and a lower outer flange and loosely mounted on the spindle, said circular members and the tubular member forming a raceway receiving the ends of the spindle.

4. In combination in a spreader of the character described, a tubular member whose ends are flanged, a circular member permanently fixed to the interior of each open end of the said tubular member and spaced from each other, a spindle, two pulleys each having a high inner flange and a lower outer flange and loosely mounted on the spindle, said circular members and the tubular member forming a raceway receiving the ends of the spindle, and the said inner flange of each pulley substantially contacting each other.

5. In combination with a line consisting of two members permanently twisted together and adapted to be under such tension in use as to maintain said members in close relationship, a spreading device comprising a tubular member, a circular member permanently fixed to the interior of each open end of the said tubular member and spaced from each other, a spindle, two pulleys each having a high inner flange and a lower outer flange and loosely mounted on the spindle, said circular members and the tubular member forming a raceway receiving the ends of the spindle, and the said inner flange of each pulley substantially contacting each other.

6. In combination in a spreader of the character described, a tubular member the interior of which is reduced in diameter at both ends, a pair of spaced ring members positioned intermediate said reduced portions and forming with said tubular member a raceway, a spindle, two pulleys loosely mounted thereon, said ring members and the tubular member forming a raceway receiving the ends of the spindle.

7. In combination with a line consisting of a plurality of members permanently twisted together and adapted to be under such tension in use as to maintain said members in close relationship, a spreader device comprising a tubular member whose interior is reduced in diameter at both ends, a pair of spaced ring members positioned intermediate said reduced portions and forming with said tubular member a raceway, a spindle, two pulleys, each having a high inner flange and a lower outer flange loosely mounted on the spindle, said ring members and the tubular member forming a raceway receiving the ends of the spindle.

8. A clothes hanging device comprising a clothesline having a pair of twisted strands, and a strand separator mounted thereon, said separator comprising a cylindrical hollow body, an axle having pulleys rotatably mounted thereon and separately engaging said strands, said body having means providing an annular raceway, in a plane perpendicular to the strands, which receives the ends of the axle.

JOHN A. DUNN.

REFERENCES CITED

The following references are of record in the file of this patent:

UNITED STATES PATENTS

| Number | Name | Date |
|---|---|---|
| 451,065 | McKay | Apr. 28, 1891 |
| 515,354 | McKay | Feb. 27, 1894 |
| 1,559,577 | Moore | Nov. 3, 1925 |
| 1,820,495 | Richardson | Aug. 25, 1931 |
| 1,887,306 | Huff | Nov. 8, 1932 |
| 2,056,481 | Pauli | Oct. 6, 1936 |